Oct. 31, 1933.  S. SANDELOWSKY  1,933,343
ELECTRODE
Filed July 30, 1931
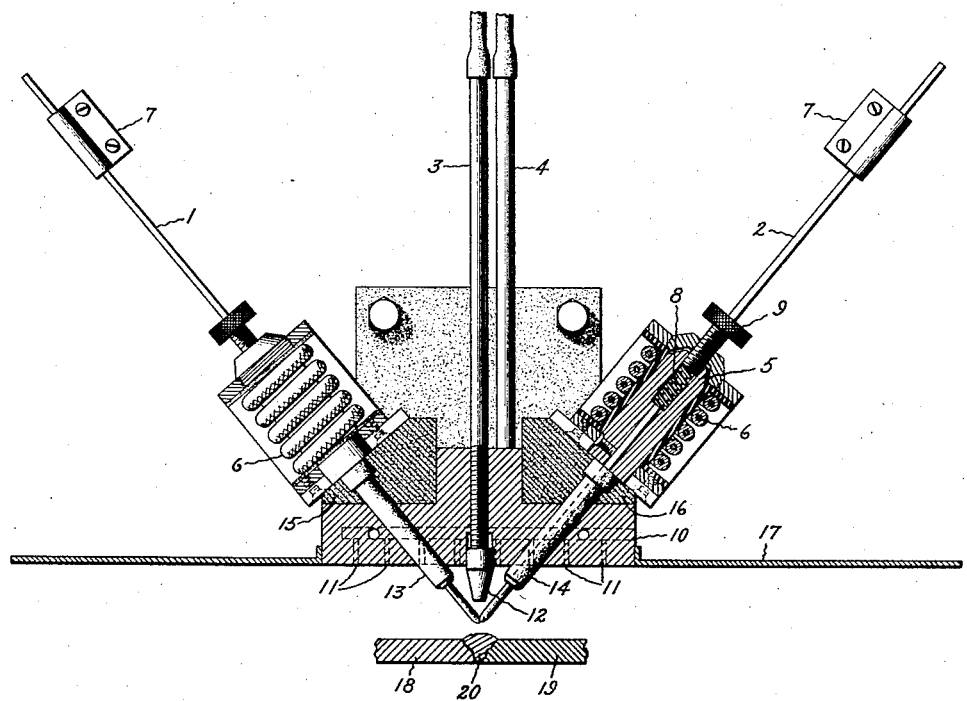
Inventor:
Sally Sandelowsky,
by Charles E. Fuller
His Attorney.

Patented Oct. 31, 1933

1,933,343

UNITED STATES PATENT OFFICE 1,933,343

ELECTRODE

Sally Sandelowsky, Hennigsdorf, near Berlin, Germany, assignor to General Electric Company, a corporation of New York Application July 30, 1931, Serial No. 554,162, and in Germany August 12, 1930

4 Claims. (Cl. 219—8)

My invention relates to electrodes for use in atomic hydrogen apparatus.

In one form of atomic hydrogen apparatus hydrogen or the hydrogen in a hydrogen containing gas is dissociated into its atomic state by means of an arc established between electrodes and thereafter permitted to recombine to produce a flame of atomic hydrogen which may be used in metallurgical operations requiring high temperatures. The utilization of such atomic hydrogen flames is disclosed in British Patent No. 237,898 and is described and claimed broadly in the copending application of Irving Langmuir, Serial No. 729,185, filed July 30, 1924, for Heating process and apparatus which application is assigned to the same assignee as the present application.

At atmospheric temperatures and pressures the atomic hydrogen flame has a temperature above 4000° K. Because of its high melting point (about 3670° K.) it has already been proposed in the reference noted above to employ in atomic hydrogen apparatus electrodes of tungsten. When pure hydrogen is used for generating atomic hydrogen tungsten electrodes are quite satisfactory, but in the presence of a hydrocarbon gas tungsten carbides are formed which have lower melting points than that of metallic tungsten, and the formation of these carbides causes the electrodes to waste away rapidly.

It is an object of my invention to provide arcing electrodes which are more resistant than electrodes heretofore employed and which may be advantageously used in atmospheres of hydrocarbons, and particularly in an atomic hydrogen apparatus where the electrode is subjected to the high temperature of an atomic hydrogen flame.

According to my invention I employ an electrode of tantalum which in the presence of a hydrocarbon atmosphere becomes carbonized, or I employ an electrode consisting principally of tantalum carbide which may be composed of tantalum carbide crystals or metallic tantalum which has been carbonized in a carbonaceous atmosphere. The electrodes should consist principally of tantalum carbide. Electrodes have been found to be particularly appropriate which consist of a mixture of four parts tantalum carbide and one part zirconium carbide, or four parts tantalum carbide and one part hafnium carbide.

The single figure of the drawing illustrates my invention as applied in the welding torch described and claimed in the above-identified application of Irving Langmuir.

In accordance with my invention the electrodes 1 and 2 are of tantalum, or of a substance consisting principally of tantalum carbide when the gas supplied through conduits 3 and 4 is a hydrocarbon gas. The electrodes are each connected to cores 5 which are under the control of windings 6 which may be connected in series with the electrodes to a suitable source of welding current. Current is supplied to the electrodes through terminals 7. The electrodes are biased toward one another by means of springs 8 which act against the cores 5. The tension of the springs may be adjusted by thumb screws 9. When current flows through the windings 6, the cores 5 are lifted within the coils thereby compressing the springs 8 and separating the arcing terminals of the electrodes.

Above the arcing terminals of the electrodes a metal plate 10 is provided which contains a number of ducts 11 communicating with the conduit 4 whereby low pressure bathing gas may be supplied about the work so as to prevent air from being drawn into the jet of gas supplied through the tip 12 by means of conduit 3. The electrodes are insulated from the plate 10 by insulating bushings 13 and 14 which are supported in insulating blocks 15 and 16 on plate 10 which also serve as supports for the controlling mechanisms embodying coils 6. A shield 17 is preferably provided to protect the operator and to prevent undue heating of the coils and other parts of the apparatus, but more particularly to help conserve the bathing gas supplied through the plate 10.

The work to be welded is illustrated diagrammatically as comprising two plates 18 and 19 united by weld metal 20. Not only the weld metal 20 but also adjoining parts of the work are fused and commingled by the heat of the atomic hydrogen blast generated by the apparatus described.

Although tantalum has a melting point much lower than tungsten, the melting point of tantalum carbide is about 500° C. greater than the melting point of tungsten. In addition to its higher melting point tantalum carbide has an evaporation about 30 per cent less than that of tungsten when operating at an equal temperature and as has been pointed out above is not affected by operation in atmospheres of hydrocarbons as is tungsten. Zirconium carbide and hafnium carbide both have higher melting points than the melting point of tungsten, and the particular electrodes above identified consisting of combinations of tantalum carbide and zirconium carbide or hafnium carbide, have been found to be particularly appropriate for use in atomic hydrogen apparatus.

What I claim as new and desire to secure by Letters Patent of the United States, is:

1. Apparatus comprising an electrode consisting principally of tantalum carbide, means including said electrode for establishing an electric arc, and means for supplying about the arcing terminal of said electrode a hydrocarbon gas.

2. Atomic hydrogen apparatus comprising electrodes of tantalum, means for establishing an arc between said electrodes, and means for supplying about the arcing terminals of said electrodes a hydrocarbon gas.

3. An electrode for atomic hydrogen apparatus consisting of a mixture of four parts tantalum carbide and one part zirconium carbide.

4. An electrode for atomic hydrogen apparatus consisting of a mixture of four parts tantalum carbide and one part hafnium carbide.

SALLY SANDELOWSKY.